UNITED STATES PATENT OFFICE.

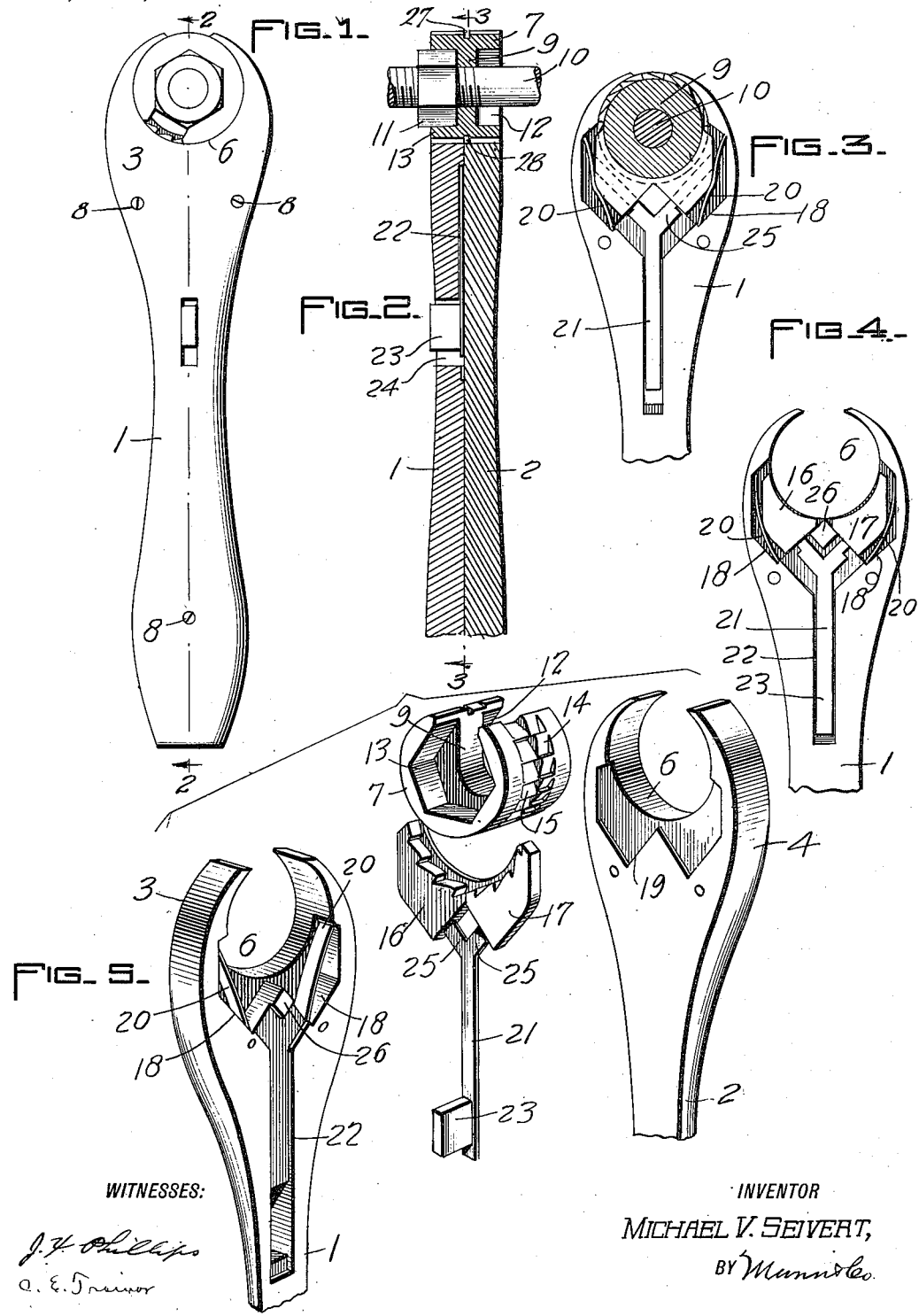

MICHAEL VERN SEIVERT, OF ELKTON, SOUTH DAKOTA.

WRENCH.

1,157,427.  Specification of Letters Patent.  Patented Oct. 19, 1915.

Application filed July 29, 1915. Serial No. 42,501.

*To all whom it may concern:*

Be it known that I, MICHAEL V. SEIVERT, a citizen of the United States, and a resident of Elkton, in the county of Brookings and State of South Dakota, have invented a new and useful Improvement in Wrenches, of which the following is a specification.

My invention is an improvement in wrenches, and the invention has for its object to provide a wrench especially adapted for use in restricted places, wherein the nut or bolt to be released can be engaged either radially or longitudinally, and wherein a chuck is provided that is mounted to rotate in a handle and is provided with pawl and ratchet mechanism for preventing reverse rotation in either direction, wherein the chuck is removable from the handle and reversible, and wherein releasable mechanism is provided, releasable with the pawl and ratchet mechanism for releasing the chuck to permit it to move out of the opening of the handle.

In the drawings:—Figure 1 is a top plan view of the improved wrench, Fig. 2 is a section on the line 2—2 of Fig. 1, looking in the direction of the arrows adjacent to the line, Fig. 3 is a section on the line 3—3 of Fig. 2, looking in the direction of the arrows adjacent to the line, Fig. 4 is a view similar to Fig. 3 with the chuck removed, and Fig. 5 is a perspective view of the upper portion of the wrench with the parts separated.

In the present embodiment of the invention, the wrench is composed of sections 1 and 2, each having at one end a head 3 and 4, respectively, and the heads have registering openings 6 for receiving the chuck 7. The sections are arranged to be superposed upon each other, and are secured together by means of screws 8, and the chuck 7 is movable into and out of the registering openings 6 laterally with respect to the shank or handle of the tool.

The chuck has a central opening 9 of a size to permit the passage of the rod or bolt 10, and at each face the chuck is provided with a polygonal counterbore or recess at the opening 9 for receiving a nut 11. These recesses 12 and 13 are of different size for engaging nuts of different diameter.

It will be noted from the drawings that each of the openings 6 is a complete circular opening but has a gap at the end of the tool. The chuck has a similar gap which is adapted to be registered with the gaps of the openings 6, and this gap in the chuck is of the same diameter as the opening 9. When the gap of the chuck is brought into register with the gaps of the openings 6, the bolt or rod 10 may be inserted into the chuck through these registering gaps. A slight lateral movement of the wrench will then engage the recess 12 or 13, as the case may be, with the nut 11.

The periphery of the chuck is provided with oppositely arranged series of ratchet teeth 14 and 15, and ratchet bars or plates 16 and 17 are provided for coöperating with the teeth to hold the chuck from movement in one direction. These ratchet bars or plates are arranged in registering recesses 18 and 19 in the sections, the recesses 18 and 19 registering and communicating with the openings 6. The ratchet bars or plates are normally pressed toward the chuck by plate springs 20, arranged within the recesses 18 and they are moved away from the chuck by means of a link 21. This link is arranged within a longitudinal groove 22 on the inner face of the section 1, the said groove communicating with the recess 18 at the junction thereof, and the link has a head or lug 23 at the end remote from the ratchet bars, the said lug extending through a slot 24 in the section 1 in position to be engaged by the thumb of the user. The opposite end of the link 21 is forked as shown, and the arms 25 of the fork are connected by a head 28, and the said head has the edge adjacent to the opening 6 concave to fit the periphery of the opening. This edge of the head is adapted to engage a peripheral groove 27 in the chuck between the series of ratchet teeth to prevent axial movement of the chuck. The ratchet plates 16 and 17 are mounted on the arms and on the head, and it will be evident from the description that when the link is moved away from the chuck, not only are the ratchet plates released from the teeth, but a little further movement of the link will release the chuck as well, so that it may be moved axially away from the shank.

The teeth of the ratchet plates 16 and 17 face in the same direction, and they are intended to coöperate with either series 14 or 15 of teeth. When the chuck is arranged as shown in Fig. 5, the teeth of the plates coöperate with the teeth 15 of the chuck to prevent reverse rotation of the chuck. When the chuck is reversed, that is, turned end for end, the teeth of the ratchet plates will coöperate with the series 14 on the chuck. The teeth of the ratchet plates engage one series 14 or 15, depending upon the position of the chuck, and while they prevent reverse rotation of the chuck they offer no impediment to the movement of the chuck in the other direction.

A lug 26 is arranged in the recess 18, between the ratchet plates, and the said lug is square in cross section and is arranged with a diagonal parallel to the long axis of the shank. This provides two inclined surfaces to swing the ratchet plate 16 and 17 away from each other when they are moved away from the opening 6. The plate springs 20 normally hold the ratchet plates in engagement with the teeth 14 or 15 and they also normally hold the edge of the head 28 in engagement with the groove 27.

In operation the wrench is engaged with the rod or bolt by passing the rod or bolt through the opening at the end of the shank and through the radial recess into the central opening 9 of the chuck. By swinging the handle or shank 1 in opposite directions, the nut may be released or it may be turned on the rod or bolt. When the handle is swung in one direction the ratchet plates are released while when it is swung in the other direction they are permitted to engage the chuck. Should a nut become caught or jammed so that the chuck can not be easily disengaged therefrom the chuck may be released, and the shank may be removed, leaving the chuck in place on the nut.

Each chuck provides for nuts of two sizes, and by providing a series of chucks, having different sized openings, one shank may serve a number of different sized nuts.

I claim:—

1. A wrench comprising a shank having a transverse opening at one end circular in cross section and having a radial recess opening at the adjacent end of the shank, a cylindrical chuck having a central opening at the axis of the opening of the shank and a radial recess leading from the opening and adapted to register with the recess of the shank to permit the insertion of a rod or bolt, said chuck having the axial opening counterbored at each end and polygonal in cross section to engage a nut, said chuck having on its periphery oppositely arranged series of ratchet teeth, and having a peripheral groove between the series, a link mounted to slide within the shank to and from the opening, and having a head at the end adjacent to the opening, said head having the edge adjacent to the opening concave and the said edge being adapted to engage the groove of the chuck to prevent axial movement of the chuck, ratchet plates for engaging either series of teeth supported by the link and movable with the head, springs normally pressing the plates and head toward the chuck, said link having a lateral lug at the end remote from the head and the shank having a slot through which the lug extends to permit movement of the link.

2. A wrench comprising a shank having a transverse opening at one end circular in cross section and having a radial recess opening at the adjacent end of the shank, a cylindrical chuck having a central opening at the axis of the opening of the shank and a radial recess leading from the opening and adapted to register with the recess of the shank to permit insertion of a rod or bolt, said chuck having the axial opening counterbored at each end and polygonal in cross section to engage a nut, said chuck having on its periphery oppositely arranged series of ratchet teeth and having a peripheral groove between the series, a link mounted to move longitudinally of the shank within the same toward and from the chuck and having a head for engaging the groove to prevent axial movement of the chuck in the opening, said link carrying ratchet plates coöperating with either series of teeth of the chuck, and means outside the shank for moving the link.

3. A wrench comprising a shank having in one end a bearing opening having a radial recess and a chuck mounted to rotate in the opening, the chuck having an axial opening and a radial recess leading therefrom and adapted to register with the recess of the shank, said chuck being reversible, releasable means for preventing axial movement of the chuck with respect to the shank, said chuck having oppositely arranged series of ratchet teeth, and a pawl in connection with the holding means for the chuck for engaging either of the series to prevent reverse rotation of the chuck.

4. A wrench comprising a shank, having an opening and a chuck rotatable in the shank and reversible in the opening, said chuck having a peripheral groove, and a sliding member mounted to slide on the shank for engaging the groove to prevent axial movement of the chuck in the opening, said chuck having a series of ratchet teeth on each side of the groove and extending peripherally of the chuck, the series being oppositely arranged, and a pawl carried by the sliding member at one side of the groove for engaging either series.

5. A wrench comprising a shank and a chuck mounted to rotate in the shank, said chuck being movable axially with respect to the shank to permit the chuck to be disengaged from the shank, releasable means for preventing rotation of the chuck with respect to the shank in one direction, and means in connection with the said releasable means for preventing axial movement of the chuck in the shank.

6. A wrench comprising a shank and a chuck mounted to rotate in the shank and movable axially with respect to the shank to permit the chuck to be disengaged from the shank to reverse the chuck, releasable means for preventing axial movement of the chuck with respect to the shank, and means carried by the said releasable means for engaging the chuck in either position to prevent reverse rotation thereof.

MICHAEL VERN SEIVERT.

Witnesses:
P. A. LYNCH,
J. L. PRATT.